United States Patent [19]

Yamada

[11] Patent Number: 4,494,847
[45] Date of Patent: Jan. 22, 1985

[54] DISTANCE MEASURING SYSTEM

[75] Inventor: Masanori Yamada, Kanagawa, Japan

[73] Assignee: Canon Kabushiki Kaisha, Tokyo, Japan

[21] Appl. No.: 407,280

[22] Filed: Aug. 11, 1982

[30] Foreign Application Priority Data

Aug. 18, 1981 [JP] Japan .................... 56-129171
Jan. 14, 1982 [JP] Japan .................... 57-4310

[51] Int. Cl.³ .................. G03B 7/08; G03B 15/03; G03B 17/40; G01C 3/00
[52] U.S. Cl. ............................. 354/403; 354/429; 354/149.11; 354/238.1; 354/406; 356/1; 356/4
[58] Field of Search .......... 354/25 R, 25 A, 25 P, 354/25 N, 31, 31 F, 238, 56, 59, 400–409, 238.1, 429, 432, 433, 149.11, 237; 356/1, 4

[56] References Cited

U.S. PATENT DOCUMENTS

| 4,246,476 | 1/1981 | Stauffer | 354/25 X |
| 4,279,484 | 7/1981 | Kimura | 354/25 P |
| 4,305,657 | 12/1981 | Masunaga et al. | 356/4 |

FOREIGN PATENT DOCUMENTS 2855800 7/1980 Fed. Rep. of Germany ........ 354/25

Primary Examiner—William B. Perkey
Attorney, Agent, or Firm—Toren, McGeady and Stanger

[57] ABSTRACT

In the disclosed distance measuring system, a light measuring circuit measures light reflected from an object whose distance is to be measured. An output arrangement responds to the light measuring circuit by producing an output in the form of a signal representing a distance to an object. A device widens the scanning range of the distance measuring system when the object is more difficult to observe than usual.

9 Claims, 14 Drawing Figures

DISTANCE MEASURING SYSTEM

BACKGROUND OF THE INVENTION

1. Field of the Invention

The present invention relates to a distance measuring device and more particularly to the distance measuring device for a photographic camera.

2. Description of the Prior Art

A wide variety of distance measuring devices for measuring the distance from the device to a target object have been proposed. Such distance measuring devices may be divided mainly into so-called passive systems or active systems. In active systems, a projector in the camera scans the object space with a beam of light and the reflected light is detected to find the distance. In a passive system, light from an object is converted into an electrical signal which is then processed to find the distance, without projecting any special measuring light onto the object.

In one example of an active distance measuring device, the distance measuring operation is carried out by making a so-called zone mark that indicates where the projecting beam is searching (hereinafter referred to as "the scanning area") coincide with the image of the object on the focusing screen.

Such conventional distance measuring devices assure highly accurate distance measurements when applied to situations where it is easy to establish coincidence between the object image and the zone mark. This is so, for example, when the object is intensely illuminated or very bright, such as when the distance measurement is performed in sunlight. Under these circumstances, the object can be accurately caught. However, when the coincidence between the object image and the zone mark is difficult to achieve, accurate distance determinations cannot be made. This occurs, for example, when the object appears in a dark location and is itself dim, or when the camera is in the self-timer exposure mode. In other words, when the object is in a dark location and has a low reflectance, the object image in the finder is dark and the zone mark also is dark, so that it becomes very difficult to establish coincidence of the zone mark with the object image. Often, because the beam from the projector is turned away from the object, it is impossible to make sure of accurate distance measurements.

Other active distance measuring devices exhibit similar problems during night photography because the object whose distance is to be measured cannot be accurately perceived.

Also, in the latter case, where the photographer uses a self-timer and makes himself the object, the photographer can hardly make himself the object to coincide with the zone mark. Hence, it has been the common practice to preset the zone mark by presuming a position which the object is to occupy during a shot. However, such an arrangement exhibits a drawback in that accurate distance measurement cannot be assured because the object often assumes a position outside the target area of the projector beam.

SUMMARY OF THE INVENTION

It is an object of the present invention to provide a distance measuring device which can correctly measure a distance even when it is difficult to make the object to be measured coincide with the zone mark.

Another object of the invention is to provide a distance measuring device of simple structure.

Still another object of the present invention is to provide a distance measuring device which can assure as high an accuracy when applied to a dim object in a dim environment as for bright objects or bright environments.

It is yet another object of the present invention to provide a distance measuring device which can assure distance measurements of as high an accuracy when used with a self-timer as in ordinary photography.

These and other objects of the invention will become apparent from the following detailed description when read in light of the accompanying drawings.

DESCRIPTION OF THE PREFERRED EMBODIMENTS

Figure 1:
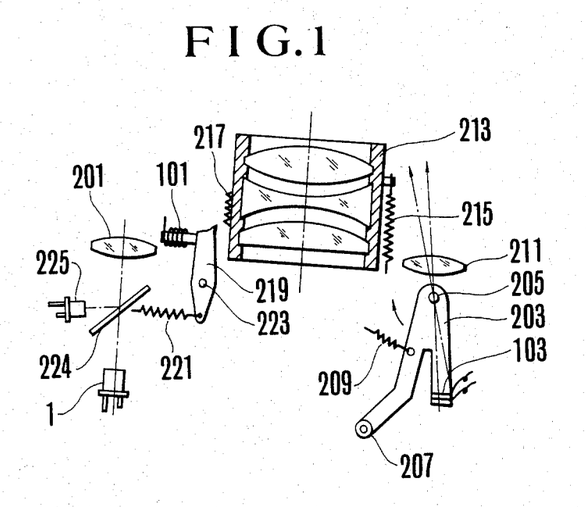
FIG. 1 is a partly sectional partly elevational view of an optical arrangement of a distance measuring device of the invention in a camera.

FIG. 1 illustrates the distance measuring device of the invention in a camera; and includes a first photosensitive element 1 having sensitivity in the infrared region and adapted to be used at the time of high brightness, or when in daylight photography, a second photosensitive element 225 having sensitivity in the infrared region and adapted to be used when the environment of the object is dark and the brightness of the object itself is low, or for in flash photography, so the photosensitive elements 1 and 225 operate selectively depending upon the exposure mode, a half-mirror 224 positioned at the cross of two optical paths to the photosensitive elements 1 and 225, a collection lens 201 arranged in front of said half-mirror 224, a two-armed scanning lever 203 pivotally mounted at a pin 205 and arranged to swingingly move as guided by a cam (not shown), a light-emitting diode 103 fixedly mounted on one end of said lever 203, the other end of which carries a roller 207 cooperating with the aforesaid cam (not shown), a spring 209 urging the scanning lever 203 to turn in a clockwise direction, a projection lens 211 arranged in front of the light-emitting diode 103, a lens barrel 213 containing a photographic objective lens system, a drive spring 215 connected to the barrel 213, detent teeth 217 on the outer periphery of the barrel 213, a stop pawl 219 whose free end is formed to a pawl-like shape and which is urged by a spring 221 to turn clockwise, a shaft 223 about which the aforesaid stop lever 219 is pivotally mounted, and a magnet 101 for initially holding the aforesaid stop lever 219 in a position illustrated in FIG. 1.

Figure 1A:
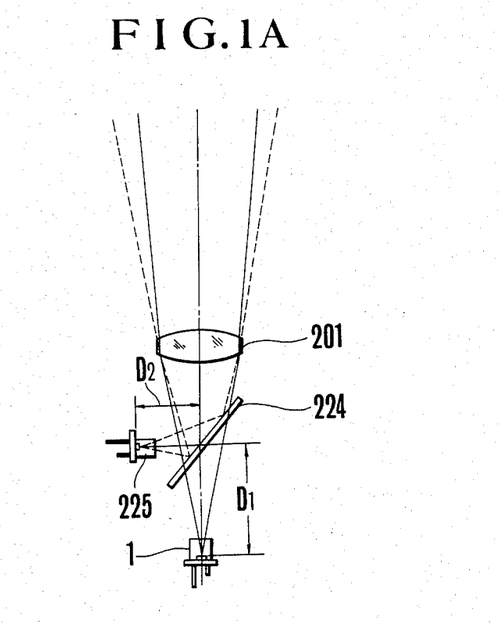
FIG. 1A is a diagram of geometry considered to explain a change of the scanning area of the light receiving system of FIG. 1.

FIG. 1A is a diagram considered to explain the operation of the parts related to the photosensitive elements of FIG. 1.

Figure 1B:
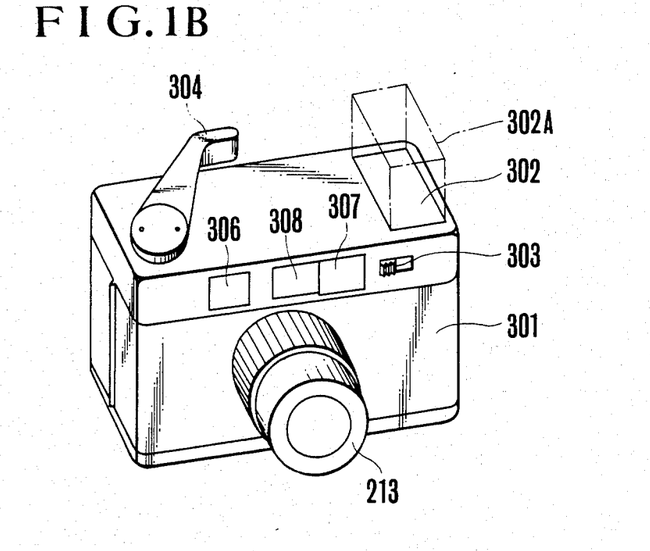
FIG. 1B is a perspective view of the outer appearance of the camera of FIG. 1.

FIG. 1B illustrates the outer appearance of the camera having the distance measuring mechanism illustrated in FIG. 1. A camera body 301 contains a flash emitting portion 302 upwardly movable to a prescribed position 302A above the upper panel of the camera housing. A control knob 303 when moved to the right manually causes the aforesaid light emitting portion 302 to pop up into the position 320A. There are further shown a film winding lever 304, a lens mounting having the barrel 213 of FIG. 1, a finder 307, a light receiving window 308 ahead the collection lens 201 of FIG. 1, a light projecting window 306 ahead the projection lens 211.

Figure 1C:
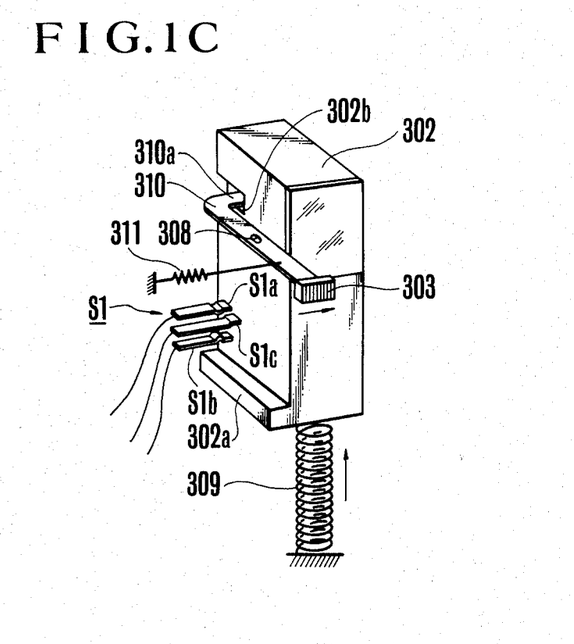
FIG. 1C is a perspective view of the parts related to a flash device in the camera of FIG. 1.

FIG. 1C in a perspective view illustrates the outer appearance of the flash light emitting portion 302 incorporated in the camera of FIG. 1B along with the relative positions of the control knob 303 and a changeover switch thereto. The control knob 303 is fixedly mounted on one end of a lever 310 which is pivotally mounted at a pin 308 on a framework of the camera body. A spring 311 urges the lever 310 in a clockwise direction. When not in use, the flash light emitting portion 302 is pushed down into the interior of the camera body against a spring 309 so an extension 310a of the lever 310 is engaged in a recess 302b of the strobe casing 302, holding the strobe in the position illustrated by the solid lines 302 in FIG. 1B. When in this position, a foot 302a of the strobe 302 does not act on a movable contact S1c of the changeover switch S1 which will be described more fully later so that the switch S1 has its S1b and S1c in contact with each other. When the control knob 303 is moved from this position to a direction indicated by arrow manually, the extension 310a is moved away from the recess 302b of the strobe casing 302, thereby the strobe 302 is lifted up by the force of the spring 309 until the flash light emitting portion occupies the space illustrated by dot-and-dash lines 302A in FIG. 1B. At this time, the foot 302a abuttingly engages the movable contact S1c of the switch S1 and brings the latter into contact with another fixed contact S1a. Thus the switch S1 is switched with S1c from S1b to S1a.

Figure 2:
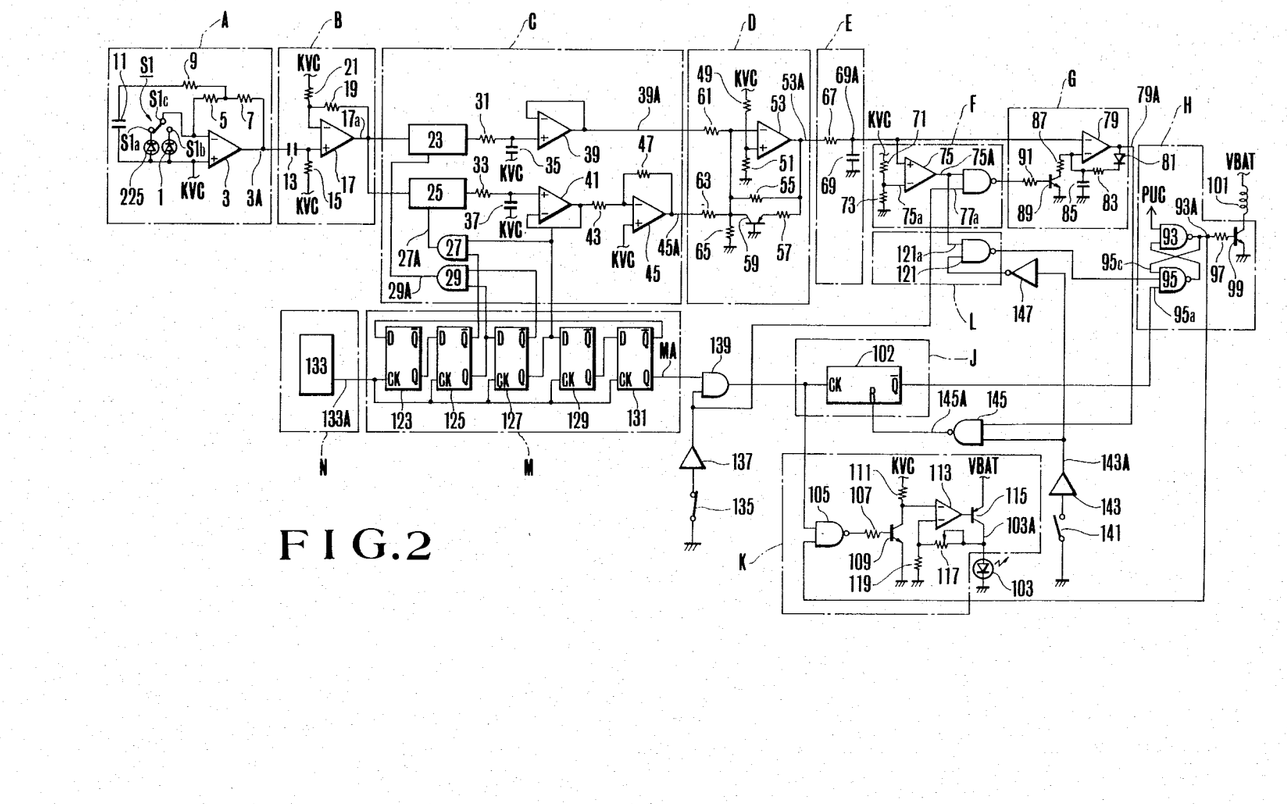
FIG. 2 is an electrical circuit diagram of the camera of FIG. 1.

That is, with the strobe 302 when in the retracted position, the switch S1 takes the position where the contacts S1c and S1b are in contact with each other and where the 1st photosensitive element 1 illustrated in FIG. 1 and to be illustrated in FIG. 2 is selected to operate.

Also when the control knob 303 is moved to the right manually, and therefore when the flash emitting portion pops up to the position 302A, the switch S1 is in a position where the contacts S1c and S1a contact, with each other as has been stated above, so the second photosensitive element 225 is selected to operate. Thus, when the camera is switched to the flash exposure mode, the photosensitive element 225 is used. When to the daylight exposure mode, the photosensitive element 1 is used.

It should be further explained in connection with the photosensitive elements 1 and 225 that they are arranged in relation to each other as illustrated in FIG. 1A. The photosensitive element 1 receives light from a scanning area by a light from the light-emitting diode 103 through the collection lens 201 and the half-mirror 224, while the photosensitive element 225 receives light coming from the collection lens 201 and reflected from the half-mirror 224. Also the distance from the center of the area of the half-mirror 224 to the photosensitive element surface is D1 for the 1st 1 and D2 for the 2nd 225, wherein D1>D2. Therefore, the length of the optical path from the center of the collection lens 201 to the 1st photosensitive element 1 is longer than that of the optical path from the collection lens center to photosensitive element 1 has a smaller angle of coverage of the object space (solid line) than the photosensitive element 225 (dashed line). That is, the photosensitive element 225 is arranged so that in flash photography as the environmental illumination is insufficient, the angle of coverage of the object space (also called the scanning area) is increased from the aforesaid one (also called the scanning area) in daylight photography.

FIG. 2 illustrates the circuitry of the distance measuring device for use in the camera of FIG. 1. In the drawing, a portion enclosed within a dashed line block A is a light measuring circuit for converting the reflected light from the object with illumination by light from the light-emitting diode 103 to an electrical signal, the light measuring circuit A having an operational amplifier 3 having two inputs across which are connected the photosensitive elements 1 and 225 and the selector switch S1, resistors 5 and 7 connected in the feedback network of the amplifier 3 and a resistor 9 connected at one end thereof to a point on connection between the resistors 5 and 7 and at the opposite end to a capacitor 11. It is to be noted that the resistance values of the resistors 5, 7 and 9 and the capacitance of the capacitor 11 are adjusted so that the gain for signals of a frequency near to the repetititon rate of lighting-on and -off of the aforesaid light emitting diode 103 is increased, and the gain of frequencies lower than this frequency is suppressed.

A portion enclosed within a dashed line block B is an amplifier circuit for amplifying the input signal of frequency near the aforesaid one, the amplifier circuit having a capacitor 13 forming a high pass filter together with a resistor 15, and an operational amplifier 17 with its non-inversion input connected to the output of the high pass filter. Also the amplifier circuit B further includes a resistor 19 connected in the feedback network of the aforesaid operational amplifier 17 and a resistor 21 connected to a point on connection between the resistor 19 and the inversion input of the aforesaid operational amplifier 17.

A portion enclosed within a dashed line block C is a synchronous detection circuit responsive to a synchronizing signal to be described later for sampling and holding the output signal from the aforesaid amplifier circuit B, the synchronous detection circuit C having analog switches 23 and 25 in the form of bipolar analog switches, for example, two AND gates 27 and 29 having outputs which are connected to the respective control electrodes of the analog switches 23 and 25, resistors 31 and 33, voltage storage capacitors 35 and 37, a follower circuit 39 connected to the output terminal of said capacitor 35, a second follower circuit 41 connected to the output terminal of the aforesaid capacitor 37, an operational amplifier 45 having an inverting input which is connected to the output terminal of said follower circuit 41 through a resistor 43, and a resistor 47 connected in the feedback network of said amplifier 45. It is to be noted that the circuit formed by the aforesaid parts 43, 45 and 47 represents an inverter which inverts at a gain of unity for the level of output signal of the aforesaid follower circuit 41 to the operational reference level KVC.

A portion enclosed within a dashed block D is a pseudo-compression circuit for amplifying those of the output signals of the aforesaid synchronous detection circuit C which are of low level and compressing those which are of high level, the pseudo-compression circuit having resistors 49 and 51 for defining a reference potential, an operational amplifier 53 having a non-inversion input which is connected to the output terminal of the voltage divider formed by the resistors 49 and 51, a resistor 55 connected between the output and inversion input terminals of said amplifier 53. a PNP transistor 59 having its emitter connected to the output terminal of said amplifier 53, and resistors 61, 63 and 65.

A portion enclosed within a dashed line block E is a low pass filter connected to the output terminal of the pseudo-compression circuit D for removing a noise component non-synchronous to the synchronizing signal, and the aforesaid synchronizing signal component, the low pass filter E having a resistor 67, and a capacitor 69 connected between said resistor 67 and ground.

A portion enclosed within a dashed line block F is a peak detection prohibiting circuit for prohibiting the operation of a peak detection circuit G to be described later when the output signal of the aforesaid low pass filter is below a prescribed value, the prohibiting circuit F having resistors 71 and 73 for defining a reference voltage, a comparator 75 having a first input terminal which is connected to the output terminal of the voltage divider circuit formed by the said resistors 71 and 73 and a second input terminal which is connected to the output terminal of the aforesaid low pass filter E, and a NAND gate 77.

A portion enclosed within a dashed line block G is the aforesaid peak detecting circuit having an operational amplifier 79 with a non-inverting input which is connected to the output terminal of the aforesaid low pass filter, a diode 81 having an anode connected to the output terminal of said amplifier 79, a capacitor 85 connected through a resistor 83 to the cathod of the aforesaid diode 81 and also connected to the inversion input terminal of the amplifier 79, an NPN transistor 89 connected in parallel to the aforesaid capacitor 85 through a resistor 87, and a resistor 91 connected to the base of said transistor 89 and the output terminal of the NAND gate 77 in the aforesaid prohibiting circuit F.

A portion enclosed within a dashed line block H is a driving circuit for driving a magnet 101, having NAND gates 93 and 95 forming a latch circuit, and an NPN transistor having a base connected to the output of said latch circuit. 101 is a magnet operatively connected to a distance measuring mechanism (not shown) to terminate the distance measuring operation. When said magnet 101 is de-energized, a stop pawl (not shown) is moved to stop the lens barrel (not shown) from further movement.

A portion enclosed within a dashed line block J is a counter having a binary ripple counter 102, said counter 102 having an input terminal CK, a reset terminal R and an output terminal $\overline{Q}$.

A portion enclosed within a dashed line block K is a driving circuit for driving the aforesaid light-emitting diode 103, having a NAND gate 105, an NPN transistor 109 having a base connected to the output terminal of the NAND gate 105, a resistor 111, an operational amplifier 113, a PNP transistor 115 connected to the aforesaid light-emitting diode 103, a variable resistor 117 connected between the collector of the transistor 115 and the non-inversion input terminal of the aforesaid amplifier 113, and a resistor 119.

A portion enclosed within a dashed line block L is a level detecting circuit, having a NAND gate 121 having an input terminal connected to the output terminal of the aforesaid comparator 75.

A portion enclosed within a dashed line block M is a frequency dividing circuit connected to the output terminal of an oscillator circuit N to be described later, including a second D type flip-flop circuit 125 having an output terminal $\overline{Q}$ which is connected to one of the input terminals of the aforesaid AND gate 27 and another output terminal Q which is connected to one of the input terminals of the aforesaid AND gate 29, and a third D type flip-flop circuit 127 having an output terminal $\overline{Q}$ which is connected to the other input terminal of the aforesaid AND gate 29, and another output terminal Q which is connected to the other input terminal of the aforesaid AND gate 27.

A portion enclosed within a dashed line block N is an oscillator circuit including an oscillator 133 having an output terminal connected to a clock input terminal CK of a 1st D type flip-flop circuit 123 in block M.

A start switch 13 with its one pole connected to ground is arranged to open when a distance measuring operation starts. A switch interface circuit 137 connects one input terminal of an AND gate 139 to the start switch 135. The other input to the AND gate 139 is connected to the output terminal of the frequency dividing circuit M or the output terminal Q of the D-type flip-flop circuit 131. A limit switch 141 has one pole connected to ground and is arranged to move from an open position to a closed position when the light-emitting diode 103 has scanned an object lying at a prescribed distance, for example, 5 meters. A NAND gate 145 has two input terminals, one of which is connected through a switch interface circuit 143 to the limit switch 141 and the other of which is connected to the output terminal of the peak detecting circuit G. An inverter 147 is connected to the output terminal of the switch interface circuit 143.

The operation of the distance measuring device for the camera of such construction will next be explained by reference to FIGS. 1, 1A to 1C and 2. The initial explanation refers to flash photography, that is where the photosensitive element 225 is selected.

As illustrated in FIG. 2, with the start switch 135 closed, and the limit switch 141 closed as occurs in an initial position, when a power switch (not shown) is thrown, prescribed voltages are produced at a voltage supply terminal VBAT and another voltage supply terminal KVC for a more stabilized voltage than that at the terminal VBAT.

Since the closure of the power switch causes the potential at the output terminal of the switch interface circuit 137 to be at a low level (hereinafter abbreviated as LL) provided that the start switch is in the closed position as stated above, the potential at the output terminal of the AND gate 139 also assumes LL, and the potential at the output terminal of the NAND gate 105 assumes high level (hereinafter abbreviated as HL). Further the transistor 109 is conducting. Therefore, the transistor 115 is in a non-conducting state, and the infrared light emitting diode 103 is unenergized.

When the light-emitting diode 103 is not lit as stated above, the object (not shown) gives off no infrared light. Therefore, the light sensing circuit A produces almost no signal, and, as a result therefrom, the potential at the output terminal of the low pass filter becomes a D.C. current level for no signal. Since the concurrent potential of the low pass filter E is lower than the output potential of the voltage divider of resistors 71 and 73, the comparator 75 produces an output potential of LL and the NAND gate 77 produces an output potential of HL. In response to the potential of HL from the NAND gate 77, the transistor 89 is rendered conducting to prohibit the peak detecting circuit G from operating, and the output potential of the operational amplifier 79 is changed to HL. Since, at this time, the potential at the output terminal of the switch interface circuit 143 is of HL as has been stated above, the potential at the output terminal of the NAND gate 145 becomes LL as soon as the potential at the output terminal of the amplifier 79 becomes HL as has been stated above, so the counter 102 is reset. Since such resetting causes the potential at the output terminal $\overline{Q}$ of the counter 102 to change to HL, the potential at one input terminal 95a of the NAND gate 95 constituting the latch circuit is also changed to HL. On the other hand, at this time, the potential at the output terminal of the NAND gate 121 is of HL because of the limit switch 141 being in the open position, and the potential at the third input terminal 95c of the NAND gate 95 is of HL by a power-up clear signal $\overline{PUC}$ produced when the aforesaid power switch was thrown, so that the output state of the latch circuit is held with fidelity in response to resetting of the counter 102, and the transistor 99 is maintained in the conducting state. Thus, an energizing current continues to flow through the transistor 99 to the solenoid 101. Therefore, the distance measuring mechanism of the camera is set in the initial position as illustrated in FIG. 1.

Figure 3:
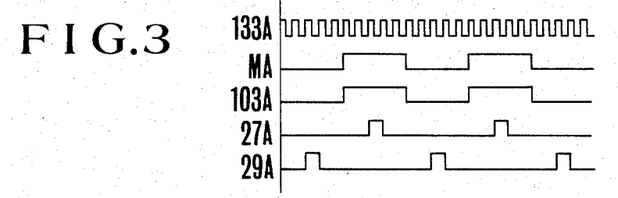
FIGS. 3 and 4 waveforms of outputs at the various portions of the circuit of FIG. 2.

Then, when the start switch 135 is opened, the potential at the output terminal of the switch interface circuit 137 is changed to HL, permitting the AND gate 139 to open and close in synchronism with a driving signal as illustrated on line MA in FIG. 3. (This driving signal represents the output signal produced at the output terminal MA of the frequency dividing circuit M of FIG. 1.) As the AND gate 139 opens and closes with the aforesaid timing, the NAND gate 105 because of its one input terminal becoming HL in response to the aforesaid power-up clear signal $\overline{PUC}$ opens and closes in response to variation of the potential at the output terminal of the AND gate 139, and lighting-on and -off of the light-emitting diode 103 repeats in synchronism with the opening and closing of the AND gate 139 as illustrated in line 103A in FIG. 3.

On the other hand, the scanning lever 203 starts to turn clockwise in synchronism with the opening of the start switch 135. The light-emitting diode 103 while giving off light intermittently scans the target area, and the barrel 213 is driven by the spring 215 to start motion with a slight delay from the start of scanning to the light-emitting diode 103 rearwardly from a position for the shortest object distance toward a position for an infinitely distant object. As the scanning proceeds, when the beam light from the light-emitting diode 103 strikes the object (not shown), the reflected beam light from the object enters through the collection lens 201 of FIG. 1 to impinge on the photosensitive element 225 of the light sensing circuit A. Then, the output terminal 3A of the light sensing circuit A produces a signal of a waveform as illustrated in line 3A in FIG. 4 with its level gradually increasing while low-frequency components related to the sun light or an artificial light such as that from a lamp are suppressed. Of the signals appearing at the output terminal 3A of the light sensing circuit A, mainly the signal of frequency near the frequency of lighting on and off of the light-emitting diode 103 after having been amplified by the amplifier circuit B is supplied to each of the input terminals of the analog switches 23 and 25. The signal appearing at the output terminal 17A of the amplifier circuit B has a waveform illustrated on line 17A in FIG. 4.

Applied to the control signal input terminal of said analog switch 23 is a synchronizing signal illustrated on line 29A in FIG. 3 from the frequency dividing circuit M through the AND gate 29. Also applied to the control signal input terminal of the analog switch 25 is a synchronizing signal illustrated on line 27A in FIG. 3 from the frequency dividing circuit M through the AND gate 27. Therefore, the signals described above are sampled by the analog switches 23 and 25 and then held by the following hold circuit. Therefore, the output terminal 39a of the follower circuit 39 exhibits a signal whose waveform is illustrated on line 39A in FIG. 4 in response to scanning of the light-emitting diode 103. Also the output terminal 45A of the inverter 45 carries a signal of waveform such as illustrated on line 45A in FIG. 4 in response to scanning of the light-emitting diode 103. As the synchronous detection circuit C responsive to scanning of the light-emitting diode 103 produces the aforesaid output signals at the terminals 39A and 45A, when their output signal levels are so low that the transistor 59 remains cut off, the output signal at the terminal 39A is amplified by a factor of $-55R/61R$ (where 55R is the resistance value of the resistor 55, and 61R is the resistance value of the resistor 61), and the output signal at the terminal 45A is amplified by a factor of $-55R/63R$ (where 63R is the resistance value of the resistor 63). These amplified signals appear at the output terminal 53A of the compression circuit D.

Figure 4:
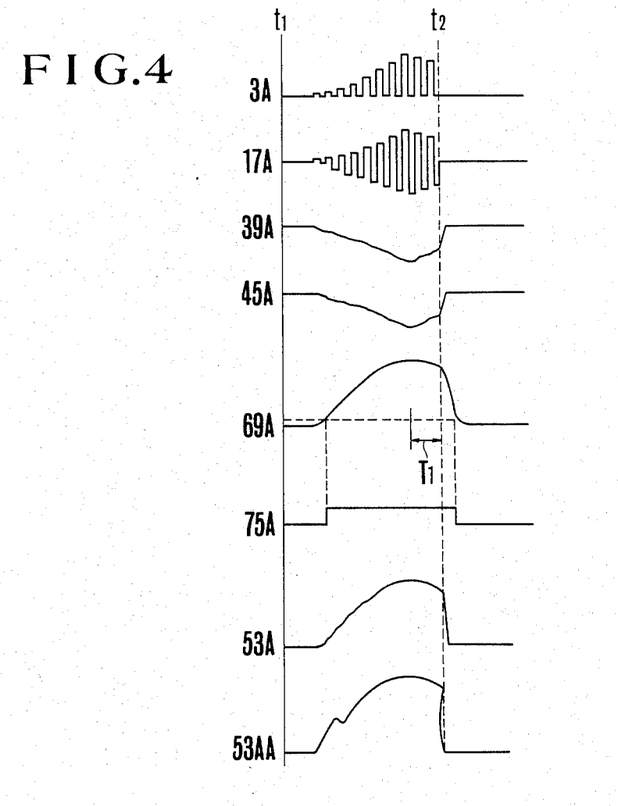

Then, as the input signal to the pseudo-compression circuit D gradually increases as illustrated on line 39A or 54A in FIG. 4, when the potential at the output terminal 53A of the amplifier 53 exceeds a level at which the base-emitter of the transistor 59 is rendered conducting, the output current of the amplifier 53 starts to flow not only through the resistor 55 but through the main electrodes of the transistor 59, namely, the emitter and collector. As illustrated on line 53A in FIG. 4, therefore, the output of the operational amplifier 53 is gradually compressed when the input signal level of the compression circuit D exceeds the prescribed level. It is to be noted that this compression rate is adjustable, depending upon the ratio of the resistance values of the resistors 55 and 57. Of the signals appearing at the output terminal 53A of the pseudo-compression circuit D, the sampling frequency component and the noise component non-synchronous with the sampling frequency are removed by the low pass filter E, while the other signal than those, that is, such signal as illustrated on line 69A in FIG. 4 is supplied to the input terminal of the peak detecting circuit G or the non-inversion input terminal of the amplifier 79.

By the way, so long as the output signal level of the low pass filter E is lower than the divided voltage of the voltage divider connected to the input terminal (−) of the comparator 75, the potential at the output of the comparator 75A is maintained at LL as illustrated on line 75A in FIG. 4. Therefore, despite the fact that the potential at the input terminal 77a of the NAND gate 77 was changed to and remains at HL in synchronism with the opening of the start switch 135, it is at this point in time that the output potential of the NAND gate 77 holds of HL, and the transistor 89 is conducting. Then, as the aforesaid scanning of the light-emitting diode 103 proceeds, when the output potential of the low pass filter E exceeds the divided voltage as the output of the voltage divider of resistors 71 and 73, the potential at the output terminal 75A of the comparator 75 is suddenly changed from LL to HL as illustrated by a waveform on line 75A in FIG. 4, and the transistor 89 is rendered non-conducting, thereby a peak detecting operation of the peak detection circuit G becomes possible. Then, the potential at the output terminal 79A of the amplifier 79 rises in proportion to the potential at the input terminal thereof, and the voltage across the poles of the capacitor 85 rises as following up the rise of the potential at the output terminal 79A. Though the potential at the output terminal 79A of the amplifier 79 continues to rise even after the change of the transistor 89 to the non-conducting state, it is when the potential at the output terminal 69A of the low pass filter E starts to fall as illustrated on line 69A in FIG. 4 that the capacitor 85 memorizes the peak value of the input signal with the help of the diode 81 since the transistor 89 is in the non-conducting state. Therefore, the feedback path of the operational amplifier 79 is cut off, permitting the difference voltage between the potential at the non-inversion input (+) and the potential at the inversion input terminal (−) to be amplified at a very large mu-factor corresponding to the open loop gain of the operational amplifier 79. Thus, the potential at the output terminal 79A of the amplifier 79 is suddenly dropped until LL. In other words, as soon as the light-emitting diode 103 scans the object at a certain distance, the potential at the output terminal 79A of the amplifier 79 drops to LL. By the way, at this point in time, the limit switch 141 remains in the open state, and the potential at one input terminal of the NAND gate 145 is of HL. Therefore, as has been stated above, when the potential at the output terminal 79A of the peak detection circuit G becomes LL, the output potential of the NAND gate 145 is changed from LL to HL, thereby the counter 102 is released from the resetting state to start counting of the pulses supplied from the frequency dividing circuit M through the AND gate 139. Where the drop of the output of the peak detection circuit G to LL is caused not by noise but by the scanning of the light-emitting diode 103, its drop lasts for a predetermined period. Therefore, the counter 102 continues counting during this period. Then at the termination of duration of the predetermined period, the output $\bar{Q}$ of the counter 102 changes from HL to LL at which the latch circuit is reset. As its NAND gate 93 changes its output potential from HL to LL, the transistor 99 is rendered non-conducting. Therefore, the solenoid 101 is de-energized, and the stop pawl 21 is turned by the spring 221 in the clockwise direction to engage one of the detent teeth 217. As a result, the photographic lens barrel 213 is stopped in a correct focusing position for the given object.

On the other hand, when the output of the NAND gate 93 changes from HL to LL as stated above, the output of the NAND gate 105 is held at HL so that the light-emitting diode 103 is turned off and the distance measuring operation completely stops. After this, a shutter control circuit (not shown) operates and a synchro-contact (not shown) is closed to fire a flash lamp, thus producing a flash exposure.

The operation of the distance measuring device when in the daylight exposure mode is substantially similar to that when in the flash exposure mode, except that the photo-sensitive element 1 is substituted for the photo-sensitive element 225. Therefore, its explanation is omitted.

It is to be noted that in the foregoing embodiment when in the flash exposure mode, the angle of coverage of the object space by the photosensitive element increases and the output of the photosensitive element decreases so that the device is more susceptible to the influence of environmental light. But, since, at this time, the level of environmental light is sufficiently small, there is no need to increase the output of the light-emitting element for light projection.

As in the above, in flash photography, the angle of field coverage of the photosensitive element for distance measurement (that is, the scanning range) becomes large as compared with that in daylight photography, As the distance measuring range widens, therefore, when the distance measurement is performed in so dark a place as to necessitate flash illumination, even somewhat inaccurate alignment of the camera to the object can assure a reduced possibility of an out-of-focus condition, and as high an accuracy of distance measurement as when in daylight photography can be obtained.

It is also to be noted that though the foregoing embodiment has been described in connection with the manual setting of the flash device in the operative position, the angle of field coverage of the photosensitive element may be made to change in automatic response to detection of the strength of environmental light.

The foregoing embodiment represents an example of the photographic situation where the brightness on the target object is so low that a good coincidence of the zone mark with the object image point is difficult to achieve. Next, another embodiment of the invention adapted to a situation in which the self-timer makes it difficult to bring the zone mark into coincidence with the object image point is described by reference to FIGS. 5 to 8.

Figure 5:
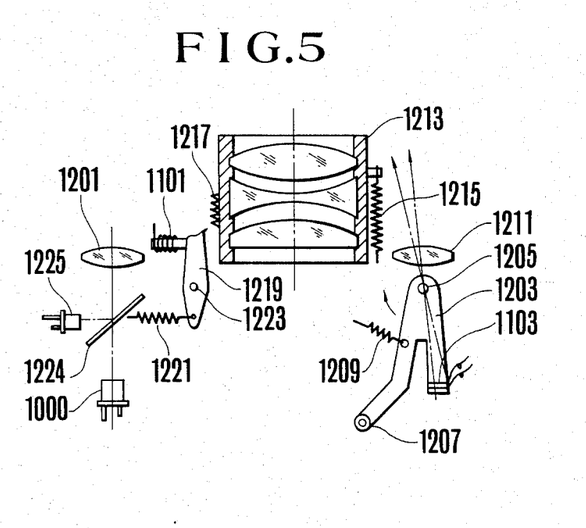
FIG. 5 is similar to FIG. 1 except for another form of the present invention.
Figure 6:
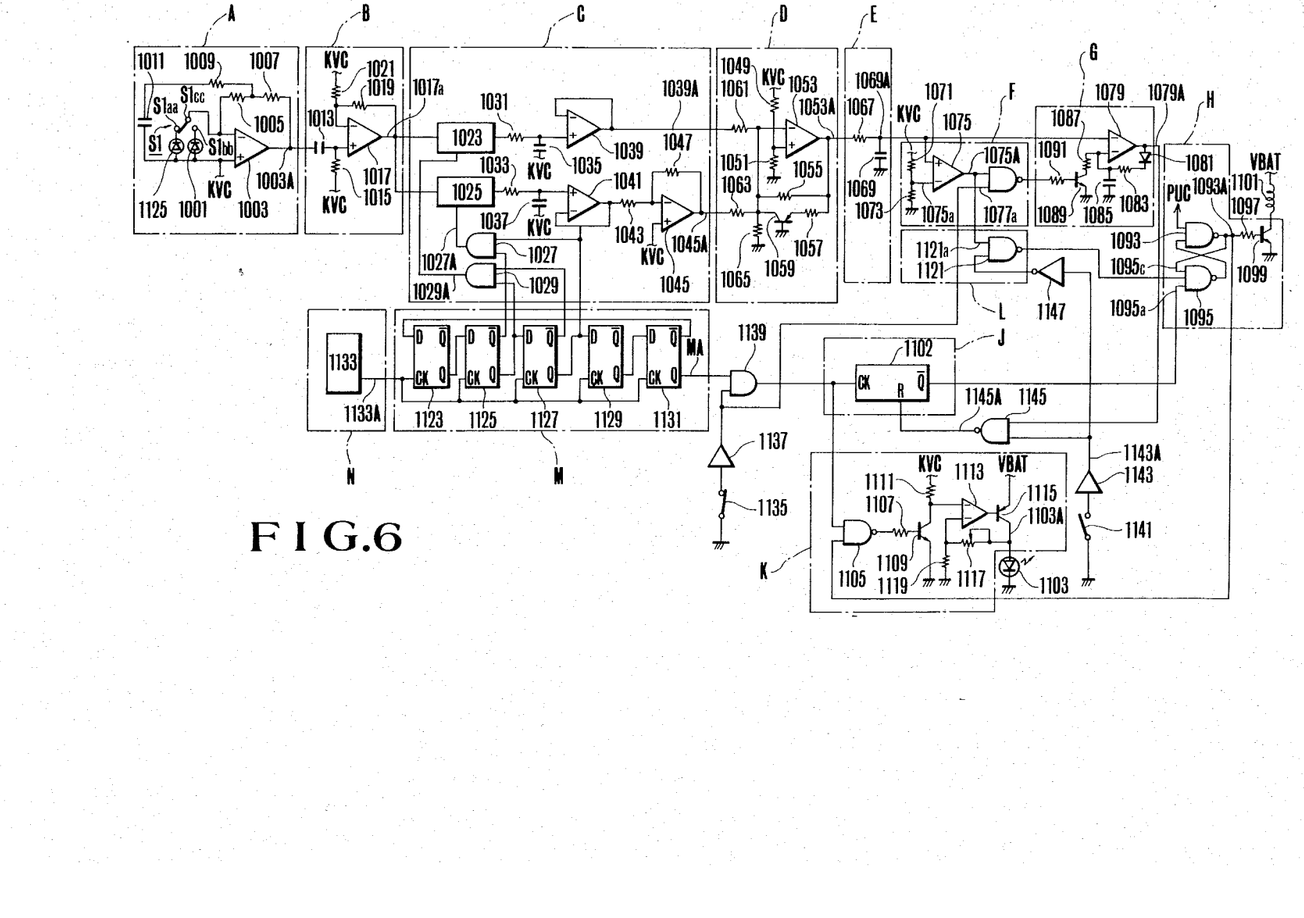
FIG. 6 is an electrical circuit diagram of the distance measuring device in the camera of FIG. 5.

FIG. 5 illustrates the main parts of a camera to which the present invention is applied. A photosensitive element 1000 is used for ordinary photography and has a sensitivity in the infrared region. A photosensitive element 1225 is used for the self-timer photography and has a sensitivity in the infrared region. The photosensitive elements 1000 and 1225 are selectively used depending upon the exposure mode. A half-mirror 1224 is positioned at the cross of two optical paths to the photosensitive elements 1000 and 1225. A collection lens 1201 is arranged in front of the half-mirror 1224. A two-armed scanning lever 1203 is pivotally mounted at a pin 1205 and arranged to swingingly move as is guided by a cam (not shown). A light-emitting diode 1103 of FIG. 6 is fixedly mounted on one end of the lever 1203, the other end of which carries a roller 1207 cooperating with the aforesaid cam (not shown). A spring 1209 urges the scanning lever 1203 to turn in a clockwise direction. A projection lens 1211 is arranged in front of the light-emitting diode 1103. A photographic objective lens systems is contained in a barrel 1213. A drive spring 1215 is connected to the barrel 1213. Detent teeth 1217 are provided on the outer periphery of the barrel 1213. A stop lever 1219 of which the free end is formed to a pawl-like shape is urged by a spring 1221 to turn in a clockwise direction, and is pivotally mounted on a shaft 1223. A magnet 1101 initially holds the stop lever 1219 in position illustrated in FIG. 5.

Figure 5A:
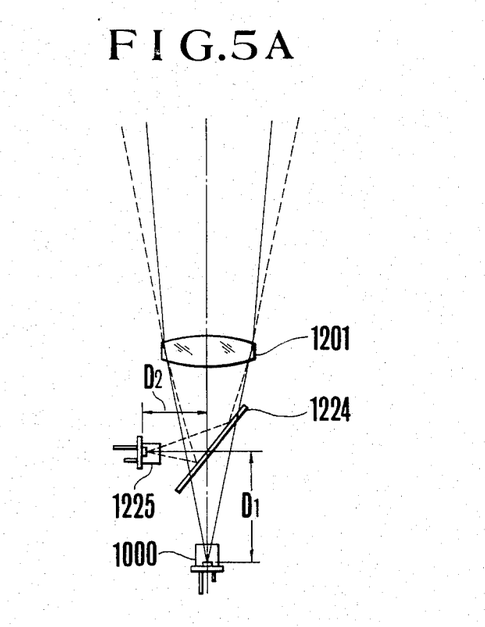
FIG. 5A is similar to FIG. 1A except that the parts related to the light receiving elements of FIG. 5 are illustrated.

FIG. 5A is a diagram considered to explain the operation of the parts related to the photosensitive elements of FIG. 5.

Figure 5B:
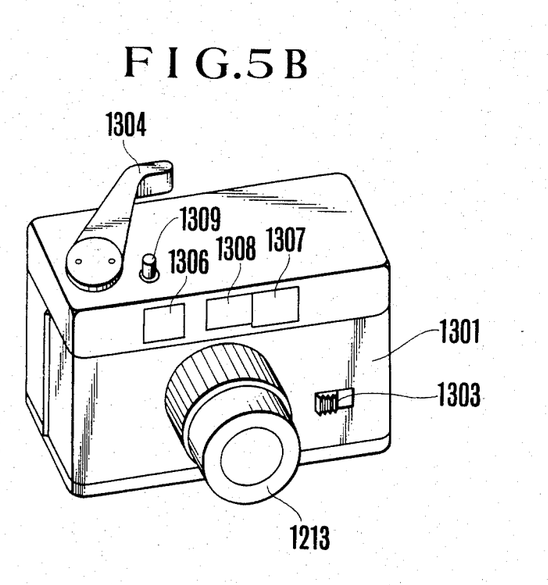
FIG. 5B is similar to FIG. 1B except that the outer appearance of the camera of FIG. 5 is illustrated.

FIG. 5B illustrates the outer appearance of the camera having the distance measuring mechanism of FIG. 5. 1301 is a camera body; and 1303 is a control knob operatively connected to a switch S1 to be described later for changing over between the normal exposure mode and the self-timer exposure mode. When the control knob 1303 is set in the position illustrated in FIG. 5B, the camera is in the self-timer mode. When it is manually shifted to the right, the camera is switched to the normal exposure mode. Also shown are a film winding lever 1304, a lens mounting having a barrel 1213 of FIG. 5, a finder 1307, a light receiving window 1308 ahead the collection lens 1201 of FIG. 1 and a light projecting window 1306 ahead the projection lens 1211.

Figure 5C:
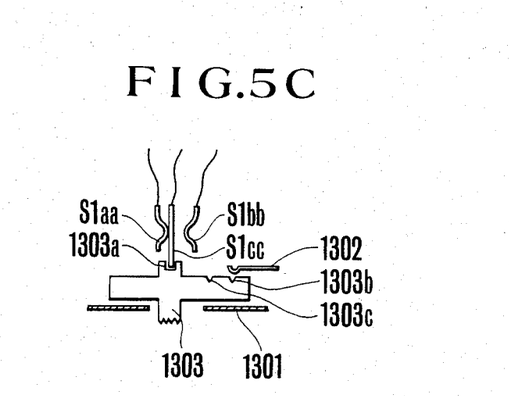
FIG. 5C is a sectional view of a mode selector switch mechanism in the camera of FIG. 5.

FIG. 5C illustrates a switch mechanism for changing over between the normal exposure mode and the self-timer exposure mode provided in the camera of FIG. 5B. When the control knob 1303 is in the position of FIG. 5C, the self-timer exposure mode operates. In this position, a letter "V"-shaped front end portion of a click spring 1302 drops in a click groove 1303b, and contacts S1cc and S1aa are in contact with each other. When the knob 1303 is slided to the right manually, the normal exposure mode is set on, as the V end portion of the click spring 1302 drops in another click groove 1303c and the contact S1cc comes into contact with a contact S1bb. That is, when in the self-timer exposure mode, the contacts S1cc and S1aa engage each other so that the photosensitive element 1225 of FIG. 5 is rendered operative. In the normal exposure mode, the S1cc and S1bb engage so that the photosensitive element 1000 of FIG. 5 is selectively rendered operative. Another switch (not shown) cooperates with the knob 1303 so that when the self-timer exposure mode is selected a self-timer circuit (not shown) is made to operate as shooting goes on. It should be further explained in connection with the photosensitive elements 1000 and 1225 that they are arranged in relation to each other as illustrated in FIG. 5A. This photosensitive element 1000 receives light from a scanning area by a light from the light-emitting diode 1103 through the collection lens 1201 and the half-mirror 1224, while the photosensitive element 1225 receives light coming from the collection lens 1201 and reflected from the half-mirror 1224. Also, they are arranged so that the distance from the center of the area of the half-mirror 1224 to the photosensitive element surface is D1 for the first element 1000 and D2 for the second element 1225, wherein D1>D2. Therefore, the length of the optical path from the center of the collection lens 1201 to the first photosensitive element 1000 is made longer than that of the optical path from the collection lens center to the second photosensitive element 1225 with the result that the first photosensitive element 1000 has a smaller angle of coverage of the object space (solid line) than the second photosensitive element 1225 has (dashed line). That is, the two photosensitive elements 1000 and 1225 are arranged so that when in the self-timer exposure mode the angle of object field coverage for the second element 1225 (This is also called the scanning area) is increased from the aforesaid angle (This is also called the scanning area) when in the normal exposure mode.

FIG. 6 illustrates the circuitry of the distance measuring device for the camera of FIG. 5. In the drawing, block A is a light sensing circuit for converting the reflected light from the object with illumination by the light-emitting diode 1103 to an electrical signal, having an operational amplifier 1003 having two inputs across which are connected the photosensitive elements 1000 and 1225 and the selector switch S1, resistors 1005 and 1007 connected in the feedback path of the amplifier 1003 and a resistor 1009 connected at one end thereof to a point on connection between the resistors 1005 and 1007 and at the opposite end to a capacitor 1011. It is to be noted that the resistance values of the resistors 1005, 1007 and 1009 and the capacitance value of the capacitor 1011 are adjusted to increase the gain of signals whose frequency is near the repetition rate at which the aforesaid light-emitting diode 1103 is hightened, turned on and off and is to suppress the gain of frequencies lower than this.

Block B is an amplifier circuit for amplifying the input signal of frequency near the aforesaid one, the amplifier circuit having a capacitor 1013 forming a high pass filter together with a resistor 1015, and an operational amplifier 1017 with its non-inverting input connected to the output of the high pass filter. The amplifier circuit B further includes a resistor 1019 connected in the feedback path of the operational amplifier 1017 and a resistor 1021 connected to a point on connection between the resistor 1019 and the inversion input of the operational amplfier 1017.

Block C is a synchronous detection circuit responsive to a synchronizing signal to be described later for sampling and holding the output signal from the amplifier circuit B, having analog switches 1023 and 1025 in the form of, for example, bipolar analog switches, two AND gates 1027 and 1029 having outputs which are connected to the respective control electrodes of the analog switches 1023 and 1025, resistors 1031 and 1033, voltage storage capacitors 1035 and 1037, a follower circuit 1039 connected to the output of the capacitor 35, a 2nd follower circuit 1041 connected to the output of the capacitor 37, an operational amplifier 1045 having an inversion input which is connected to the output of the follower circuit 1041 though a resistor 1043, and a resistor 1047 connected in the feedback path of the amplifier 1045. It is to be noted that the circuit formed by the parts 1043, 1045 and 1047 represents an inverter which inverts at a gain of unity for the level of output signal of the follower circuit 1041 to the operational reference level KVC.

Block D is a pseudo-compression circuit for amplifying those of the output signals of the aforesaid synchronous detection circuit C which are of low level and compressing those which are of high level, having resistors 1049 and 1051 for defining a reference potential, an operational amplifier 1053 having a non-inversion input which is connected to the output of the voltage divider formed by the resistors 1049 and 1051, a resistor 1055 connected between the output and inversion input of the amplifier 1053, a PNP transistor 1059 having its emitter connected to the output of the amplifier 53, and resistors 1061, 1063 and 1065.

Block E is a low pass filter connected to the output of the pseudo-compression circuit D for removing a noise component non-synchronous to said synchronizing signal, and the synchronizing signal component, having a resistor 1067 and a capacitor 1069 connected between the resistor 1067 and circuit earth.

Block F is a peak detection prohibiting circuit for prohibiting the operation of a peak detection circuit G to be described later when the output of the low pass filter E is below a prescribed level, having resistors 1071 and 1073 for defining a reference voltage, a comparator 1075 having a 1st input which is connected to the output of the voltage divider formed by the resistors 1071 and 1073 and a 2nd input which is connected to the output of the low pass filter E, and a NAND gate 1077.

Block G is the aforesaid peak detection circuit having an operational amplifier 1079 having a non-inversion input which is connected to the output of the low pass filter E, a diode 1081 having an anode connected to the output of the amplifier 1079, a capacitor 1085 connected through a resistor 1083 to the cathode of the diode 1081 and also connected to the inversion input of the amplifier 1079, an NPN transistor 1089 connected in parallel to the capacitor 1085 through a resistor 1087, and a resistor 1091 connected to the base of transistor 1089 and the output of the NAND gate 1077 in the prohibiting circuit F.

Block H is a driving circuit for driving a magnet 1101, having NAND gates 1093 and 1095 forming a latch circuit, and an NPN transistor having a base connected to the output of the latch circuit. The magnet 1101 is operatively connected to a distance measuring mechanism (not shown) to terminate the distance measuring operation. When the magnet 1011 is de-energized, a stop lever (not shown) is moved to stop the lens barrel from further movement.

Block J is a counter having a binary ripple counter 102 having an input CK, a reset terminal R and an output $\bar{Q}$.

Block K is a driving circuit for driving the light-emitting diode 1103, having a NAND gate 1105, an NPN transistor 1109 having a base connected to the output of the NAND gate 1105, a resistor 1111, an operational amplifier 1113, a PNP transistor 1115 connected to the light-emitting diode 1103, a variable resistor 1117 connected between the collector of the transistor 1115 and the non-inversion input of the amplifier 1113, and a resistor 1119.

Block L is a level detection circuit having a NAND gate 1121 having an input connected to the output of the aforesaid comparator 1075.

Block M is a frequency dividing circuit connected to the output of an oscillator circuit N to be described later, including a 2nd D type flip-flop circuit 1125 having an output $\bar{Q}$ which is connected to one of the inputs of the AND gate 1027, and another output Q which is connected to one of the inputs of the AND gate 1029, and a 3rd D type flip-flop circuit 1127 having an output $\bar{Q}$ which is connected to the other input of the AND gate 1029, and another output Q which is connected to the other input of the AND gate 1027.

Block N is an oscillator circuit including an oscillator 1133 having an output connected to a clock input CK of a 1st D type flip-flop circuit 1123 in block M.

A start switch 1135 has one pole connected to circuit earth and is arranged to open when a distance measuring operation starts. Circuit 1137 is a switch interface circuit. An AND gate 1139 has two inputs one of which is connected through the switch interface circuit 1137 to the start switch 1135 and the other of which is connected to the output of the frequency dividing circuit M or the output Q of the D type flip-flop circuit 1131. A limit switch 1141 has one pole connected to ground and is arranged to move from an open position to a closing position when the light-emitting diode has scanned an object lying in a prescribed distance, for example, 5 meters. A NAND gate 1145 has two inputs one of which is connected through a switch interface circuit 1143 to the limit switch 1141 and the other of which is connected to the output of the peak detection circuit G. An inverter 1147 is connected to the output of the switch interface circuit 1143.

Next, the operation of the camera of such construction will be described by reference to FIGS. 5, 5A to 5C and 6 to 8. The first explanation is of the self-timer mode, that is, the case where the photosensitive element 1225 is selected to operate.

When a release member 1309 illustrated in FIG. 5B is pushed down, a self-timer circuit (not shown) operates. In a predetermined time from the depression, the start switch 1135 and the limit switch 1141 are closed. In the initial position where the start switch 1135 is closed and the limit switch 1141 is open, when a power switch (not shown) on the distance measuring device is thrown, a prescribed voltage is produced at a voltage supply terminal VBAT, and another prescribed voltage which is more stabilised than that at the VBAT is produced at another voltage supply terminal KVC.

Since the closure of the power switch causes the potential at the output of the switch interface circuit 1137 to be of low level (hereinafter abbreviated as LL) provided that the start switch is in the closing position as has been stated above, the potential at the output of the AND gate 139 also takes LL, and the potential at the output of NAND gate 105 takes high level (hereinafter abbreviated as HL). Further the transistor 1109 is conducting. Therefore, transistor 1115 is in non-conducting state, and the infrared light emitting diode 1103 is unenergized.

When light-emitting diode 1103 is not lighted on as has been stated above, the object (not shown) gives off no infrared light. Therefore, the light sensing circuit A produces almost no signal, and, as a result, the potential at the output of low pass filter E becomes D.C. current level for no signal. Since the concurrent potential of the pass filter E is lower than the output potential of the voltage divider of resistors 1071 and 1073, the comparator 1075 produces an output potential of LL and NAND gate 1077 produces an output potential of HL. Responsive to the potential of HL from NAND gate 1077, transistor 1089 is rendered conducting to prohibit peak detection circuit G from operating, and the output potential of operational amplifier 1079 is changed to HL. Since, at this time, the potential at the output of switch interface circuit 1143 is of HL as has been stated above, the potential at the output of NAND gate 1145 becomes LL as soon as the potential at the output of amplifier 1079 becomes HL as has been stated above, thereby counter 102 is reset. Since such resetting causes the potential at the output $\bar{Q}$ of counter 102 to change to HL, the potential at one input terminal 1095a of NAND gate 1095 constituting the latch circuit is also changed to HL. On the other hand, at this time, the potential at the output of NAND gate 1121 is of HL because of the limit switch 1141 being in the open position, and the potential at the 3rd input 1095c of NAND gate 1095 is of HL by a power-up clear signal $\overline{PUC}$ produced when the aforesaid power switch was thrown, so that the output state of the latch circuit is held with fidelity in response to resetting of the counter 1102, and transistor 1099 is maintained in the conducting state. Thus, an energizing current continues to flow through the transistor 1099 to to solenoid 1101. Therefore, the distance measuring mechanism of the camera is set in the initial position as illustrated in FIG. 5.

Figure 7:
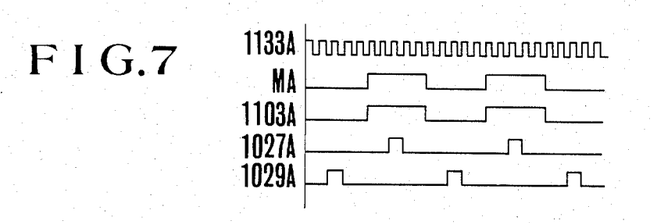
FIGS. 7 and 8 are waveforms of outputs at the various portions of the circuit of FIG. 6.

Then when the start switch 1135 is opened, the potential at the output of switch interface circuit 1137 is changed to HL, permitting AND gate 1139 to open and close in synchronism with a driving signal as illustrated on line MA in FIG. 7 (This driving signal represent the output signal produced at the output MA of the frequency dividing circuit M of FIG. 2). As AND gate 1139 opens and closes in the aforesaid timing, NAND gate 1105 is, because of its one input becoming HL in response to the power-up clear signal $\overline{PUC}$, caused to open and close in response to variation of the potential at the output of AND gate 1139, and lighting on and off of light-emitting diode 1103 repeats at such a synchronous timing to the opening and closing of AND gate 1139 as illustrated on line 1103A in FIG. 7.

In synchronism with the opening of start switch 1135, scanning lever 1203 of FIG. 5 starts to turn clockwise. Light-emitting diode 1103 while giving off light intermittently scans the target area, and barrel 1213 is driven by the spring 1215 to start motion in a slight delay from the start of scanning of the light-emitting diode 103 rearwardly from a position for the shortest object distance toward a position for an infinitely distant object. And, as the scanning proceeds, when the beam light from the light-emitting diode 1103 strikes the object (not shown), the reflected beam light from the object enters through the collection lens 1201 of FIG. 5 to impinge on photosensitive element 1225 of light sensing circuit A. Then, at the output 1003A of light sensing circuit A is produced a signal of such wave form as illustrated on line 1003A in FIG. 8 with its level gradually increasing while low-frequency components related to the sun light or an artificial light such as that from a lamp being suppressed. Of the signals appearing at the output 1003A of light sensing circuit A, mainly the signal of frequency near the frequency of lighting on and off of light-emitting diode 1103 after having been amplified by amplifier circuit B is supplied to each of the inputs of analog switches 1023 and 1025. The signal appearing at the output 1017A of amplifier circuit B has a waveform illustrated on line 1017A in FIG. 8.

The control signal input of analog switch 1023 receives a synchronizing signal illustrated on line 1029A in FIG. 7 from the frequency dividing circuit M through AND gate 1029. The control signal input of analog switch 1025 also receives a synchronizing signal illustrated on line 1027A in FIG. 7 from the frequency dividing circuit M through AND gate 1027. These signals are sampled by the analog switches 1023 and 1025 and then held by the following holding circuit. Therefore, the output 1039A of the follower circuit 1039 exhibits a signal as illustrated on line 1039A in FIG. 8 in response to scanning of light-emitting diode 1103. At the output 1045A of the inverter 1045 carries a signal of a waveform such as illustrated on line 1045A of FIG. 8 in response to scanning of light-emitting diode 1103. As synchronous detection circuit C responsive to scanning of light-emitting diode 1103 produces the output signals at terminals 1039A and 1045A, when their output signal levels are so low that transistor 1059 remains cut off, the output signal at terminal 1039A is amplified by a factor of $-55R/61R$ (where 55R is the resistance value of resistor 1055, and 61R is the resistance value of resistor 1061), and the output signal at terminal 1045A is amplified by a factor of $-55R/63R$ (where 63R is the resistance value of resistor 1063). These amplified signals appear the output 1053A of the compression circuit D.

Figure 8:
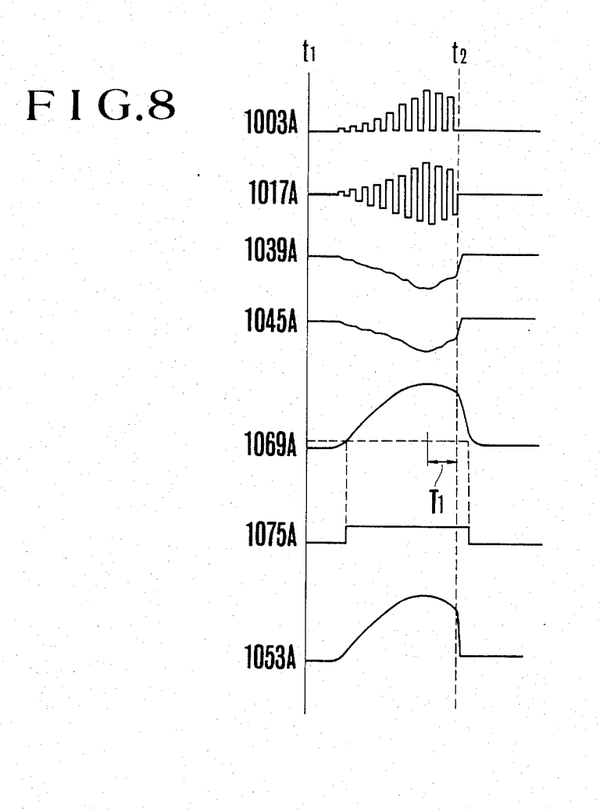

Then, as the input signal to pseudo-compression circuit D gradually increases as illustrated on line 1039A or 1054A in FIG. 8, when the potential at the output 1053A of amplifier 1053 exceeds a level at which the base-emitter of transistor 1059 is rendered conducting, the output current of amplifier 1053 starts to flow not only through resistor 1055 but also through the main electrodes or emitter and collector of transistor 1059. As illustrated on line 1053A in FIG. 8, therefore, the output of operational amplifier 1053 is gradually compressed when the input signal level of compression circuit D exceeds the prescribed level. It is to be noted that this compression rate is adjustable, depending upon the ratio of the resistance values of resistors 1055 and 1057. Of the signals appearing at the output 1053A of pseudo-compression circuit D, the sampling frequency component and the noise component non-synchronous with the sampling frequency are removed by the low pass filter E, while the other signal than those, that is, such signal as illustrated on line 1069A in FIG. 8 is supplied to the input of the peak detecting circuit G or the non-inversion input of amplifier 1079.

By the way, so long as the output signal level of low pass filter E is lower than the divided voltage of voltage divider connected to the input (−) of comparator 1075, the potential at the output comparator 1075A is maintained at LL as illustrated on line 1075A in FIG. 8. Therefore, despite the fact that the potential at the input 1077a of NAND gate 1077 was changed to and remain at HL in synchronism with the opening of start switch 1135, it is at this time that the output potential of NAND gate 1077 holds of HL, and the transistor 1089 is conducting. Then, as the aforesaid scanning of light-emitting diode 1103 proceeds, when the output potential of low pass filter E exceeds the divided voltage as the output of voltage divider of resistors 1071 and 1073, the potential at the output 1075A of comparator 1075 is suddenly changed to HL as illustrated by a waveform on line 1075A in FIG. 8, and the transistor 1089 is rendered non-conducting, thereby a peak detecting operation of peak detection circuit G becomes possible. Then the potential at the output 1079A of amplifier 1079 rises in proportion to the potential at the input thereof, and the voltage across the poles of capacitor 1085 rises as following up the rise of the potential at the output 1079A. Though the potential at the output 1079A of amplifier 1079 continues to rise even after the change of transistor 1089 to the non-conducting state, it is when the potential at the output 1069A of low pass filter E starts to fall as illustrated on line 1069A in FIG. 8, that the capacitor 1085 memorizes the peak value of the input signal with the help of diode 1081 since the transistor 1089 is in the non-conducting state. Therefore, the feedback path of the operational amplifier 1079 is cut off, permitting the difference voltage between the potential at the non-inversion input (+) and the potential at the inversion input (−) to be amplified at a very large mufactor corresponding to the open loop gain of the operational amplifier 1079. Thus, the potential a- the output 1079A of amplifier 1079 is suddenly dropped until LL. In other words, as soon as light-emitting diode 1103 scans the object at a certain distance, the potential at the output 1079A of amplifier 1079 drops to LL. By the way, at this point in time, the limit switch 1141 remains in the open state, and the potential at one input of NAND gate 1145 is of HL. Therefore, as has been stated above, when the potential at the output 1079A of peak detection circuit G becomes LL, the output potential of NAND gate 1145 is changed from LL to HL, thereby counter 1102 is released from the resetting state to start counting of the pulses supplied from the frequency dividing circuit M through AND gate 1139. And, in case where the drop of the output of peak detection circuit G to LL is caused not by noise but by the scanning of the light-emitting diode 1103, its dropping lasts for a predetermined period. Therefore, counter 1102 continues counting during this period. Then at the termination of duration of the predetermined period, the output $\bar{Q}$ of counter 1102 changes from HL to LL at which the latch circuit is reset. As its NAND gate 1093 changes its output potential from HL to LL, transistor 1099 is rendered non-conducting. Therefore, the solenoid 1101 is de-energized, and the stop lever 1021 is turned by spring 1221 in the clockwise direction to engage one of the detent teeth 1217. As a result, the photographic lens barrel 1213 is stopped in a correct focusing position for the given object distance.

On the other hand, when the output of NAND gate 1093 changes from HL to LL as has been stated above, the output of NAND gate 1105 is held in HL so that light-emitting diode 1103 is lighted off and the distance measuring operation completely stops. After this, a shutter control circuit (not shown) operates to initiate an exposure operation.

When in the normal exposure mode, the self-timer circuit is in the inoperative position, and depression of the release member 1309 results in actuation of the distance measuring circuit. The operation of the distance measuring circuit is substantially similar to that when in the self-timer exposure mode except that the photosensitive element 1000 is substituted for the photosensitive element 1225. Therefore, its explanation is omitted here.

In the above embodiment, when the camera is switched to the self-timer mode, the scanning range is made wider than that of the normal exposure mode. This increases the probability of accurately catching the object and it offers the advantage of making it possible to improve the accuracy of the distance measurement in the self-timer exposure mode to a level as high as in the normal exposure mode.

As described above, according to the present invention, it is possible to obtain a more correct distance measuring result than was heretofore possible with conventional devices, even in photographic situations that make it difficult to establish good coincidence of the zone mark with an image point of the object whose distance is to be measured.

What is claimed is:

1. A distance measuring system comprising:
 (a) light emitting means for emitting light to illuminate an object;
 (b) light measuring means for measuring light reflected from the object;
 (c) means for broadening a distance measuring zone when the brightness on the object is lower from a distance measuring zone when the brightness is high; and
 (d) electrical output means for producing the output signal of said light measuring means in the form of a signal representing a distance to the object.

2. A distance measuring system according to claim 1, wherein said light measuring means includes two light measuring elements, one element having a first distance measuring zone, and the other element having a second distance measuring zone broader than the first distance measuring zone.

3. A distance measuring system comprising:
 (a) light measuring means for measuring light from an object and for producing an output signal corresponding to the light;
 (b) means for widening a distance measuring zone of the light measuring means when the object is difficult to observe as compared to that when the object is easy to observe; and
 (c) output means for producing the output signal of said light measuring means in the form of a signal representing a distance to the object;
 (d) said light measuring means including two light measuring elements, one element having a first distance measuring zone, the other element having a second distance measuring zone broader than the first distance measuring zone;
 (e) said widening means includes:
 (e1) a collection lens;
 (e2) a half mirror positioned between one of said light measuring elements and the other to transmit the light coming from the object through said collection lens to said light measurement elements; and
 (e3) selecting means for selectively supplying the outputs of said light measurement elements to said output means.

4. A distance measuring system comprising:
 (a) light measuring means for measuring light from an object;
 (b) means for broadening a distance measuring zone when the brightness on the object is lower from a distance measuring zone when the brightness is high; and
 (c) output means for producing the output signal of said light measuring means in the form of a signal representing a distance to the object;
 (d) said light measuring means includes two light measuring elements, one element having a first distance measuring zone, and the other element having a second distance measuring zone broader than the first distance measuring zone range;
 (e) said broadening means including;
 (e1) a collection lens;
 (e2) a half mirror positioned between one of said light measuring elements and the other to transmit the light coming from the object through said collection lens to said light measurement elements; and
 (e3) selecting means for selectively supplying the outputs of said light measurement elements to said output means.

5. A distance measuring system for a camera comprising:
 (a) light measuring means for measuring light from an object, (b) means for broadening a distance measuring zone when in the self-timer exposure mode from that when in the normal exposure mode;

(c) output means for producing the output signal of said light measurement means in the form of a signal representing a distance to the object; and (d) said light measuring means including two light measuring elements, one element having a first distance measuring zone, and the other element having a second distance measuring zone broader than the first distance measuring zone;

(e) said broadening means including:

(e1) a collection lens;

(e2) a half mirror positioned between one of said light measuring elements and the other to transmit the light coming from the object through said collection lens to said light measuring elements; and (e3) selecting means for selectively supplying the outputs of said light measurement elements to said output means.

6. A distance measuring system comprising:

(a) light measuring means for measuring light from an object whose distance is to be measured and for producing an output signal corresponding to the light;

(b) means for widening a scanning range of the distance measuring system when the object is difficult to observe from that when the object is easy to observe;

(c) output means for producing the output signal of said light measuring means in the form of a signal representing a distance to the object; and (d) said light measuring means including two light measuring elements, one element having a first light measurement range the other element having a second light measurement range broader than the first light measurement range;

(e) said widening means includes:

(e1) a collection lens;

(e2) a half mirror positioned between one of said light measuring elements and the other to transmit the light coming from the object through said collection lens to said light measurement element; and (e3) selecting means for selectively supplying the outputs of said light measurement elements to said output means.

7. A distance measuring system comprising:

(a) light emitting means for emitting light to illuminate an object;

(b) light measuring means for measuring light reflected from the object whose distance is to be measured;

(c) means for broadening a scanning range when the brightness on the object is low from a scanning range when the brightness is high; and (d) output means for producing the output signal of said light measuring means in the form of a signal representing a distance to the object;

(e) said light measuring means including two light measuring elements, one element having a first light measurement range, and the other element having a second light measurement range broader than the first light measurement range.

8. A distance measuring system according to claim 7, wherein said broadening means includes:

(a) a collection lens;

(b) a half mirror positioned between one of said light measuring elements and the other to transmit the light coming from the object through said collection lens to said light measurement elements; and (c) selection means for selectively supplying the outputs of said light measurement elements to said output means.

9. A distance measuring system for a camera comprising:

(a) light measuring means for measuring light from an object whose distance is to be measured;

(b) means for broadening a scanning range when in the self-timer exposure mode from that when in the normal exposure mode; and (c) output means for producing the output signal of said light measurement means in the form of a signal representing a distance to the object;

(d) said light measuring means including two light measuring elements, one element having a first light (e) said broadening means includes:

(e1) a collection lens;

(e2) a half mirror positioned between one of said light measuring elements and the other to transmit the light coming from the object through said collection lens to said light measurement elements; and (e3) selecting means for selectively supplying the outputs of said light measurement elements to said output means.

* * * * *